Figure 1:
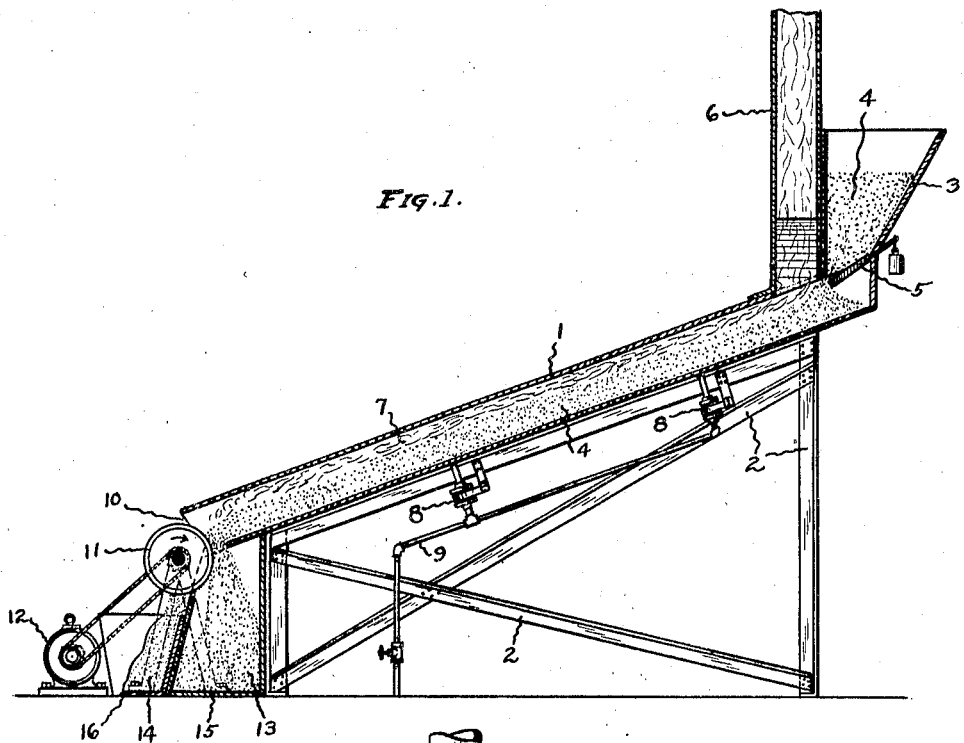

Oct. 18, 1927.

J. G. G. FROST 1,646,239

PROCESS OF RECOVERING ALUMINUM FROM OILY METALLIC MIXTURES AND THE LIKE

Filed March 17, 1926

INVENTOR
John G. G. Frost
Evans and McCoy
ATTORNEYS

Patented Oct. 18, 1927.

1,646,239

UNITED STATES PATENT OFFICE.

JOHN G. G. FROST, OF CLEVELAND, OHIO, ASSIGNOR TO THE NATIONAL SMELTING COMPANY, OF CLEVELAND, OHIO, A CORPORATION OF OHIO.

PROCESS OF RECOVERING ALUMINUM FROM OILY METALLIC MIXTURES AND THE LIKE.

Application filed March 17, 1926. Serial No. 95,270.

This invention relates to the separation of non-magnetic from magnetic material in mixtures thereof containing oily or viscous material.

In the recovery of aluminum from borings, tailings, and the like, it has been found extremely difficult, if not impossible, to remove the small metallic particles of iron therefrom due to oil or other viscous combustible material surrounding the small particles of metal. It appears that such oily or other viscous material surrounds the metallic particles or causes them to adhere to each other so that small particles of iron can not be extracted from such oily mixture by any convenient means, such as by an electromagnet.

It is desirable, however, that substantially all the iron be removed from such tailings and the like before the smelting thereof in order that the smelted aluminum may contain a minimum percentage of iron.

An object of this invention is to provide a method of separating non-magnetic from magnetic particles in mixtures thereof containing viscous combustible material.

Another object of my invention is to provide a method of recovering aluminum from oily mixtures of small particles of aluminum and iron.

Other objects of the invention will be apparent to those skilled in the art from the description of it hereinafter given.

Figure 2:
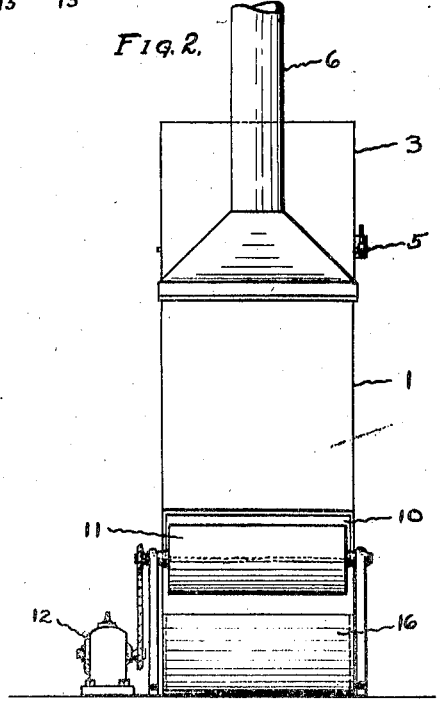

In the drawings:

Figure 1 is a vertical sectional view of an apparatus suitable for carrying out my improved process; and Fig. 2 is a front elevation of the apparatus shown in Fig. 1.

I have found that iron and aluminum may be readily separated from mixtures thereof containing oily or other viscous combustible material, by removing said oily or combustible material substantially completely by combustion and subjecting the remaining iron and aluminum to an electromagnetic separator. Preferably, such separation is carried out by a continuous process.

The apparatus shown comprises an inclined container 1, suitably supported by a framework 2. The container 1 may be of any suitable cross sectional shape, such as, for example, rectangular, and may be constructed of sheet metal. At the upper end of the container 1 is shown a hopper 3, through which oily borings, tailings or other material 4 may be continuously supplied to the container 1. A counterweighted valve 5 may be disposed at the bottom of the hopper 3 to regulate the rate of feed to the container 1. Also disposed adjacent the upper end of the container is a stack 6 for the outward passage of combustion products of the combustible material, as will be more fully described hereinafter.

In order to completely burn the oily or other combustible material in the charge, the material 4 in the container 1 is preferably agitated to expose the surface of the metallic particles substantially completely to the flames 7. To accomplish the above purpose and also to assist in moving the material 4 downwardly through the container 1, the said container may be vibrated, such as by the pneumatic air hammers 8 supplied with compressed air from the compressed air line 9.

Disposed at the lower end of the container 1 is the outlet aperture 10, adjacent which is disposed an electromagnetic separator 11, which may be driven by suitable connecting means from the motor 12. To receive the non-magnetic aluminum 13 and magnetic iron 14 respectively, there may be provided the containers 15 and 16. It will be noted that air may enter through the aperture 10 and pass upwardly through the container 1, whereby the combustible material in the container may be burned substantially completely.

In operation, the material 4, containing ordinarily a mixture of small particles of iron and aluminum but principally aluminum, together with oily or other viscous combustible material, is disposed in the hopper 3, an excess of such material 4 being ordinarily maintained in the hopper. The material 4 has ordinarily been previously subjected to a magnetic separator to remove the large pieces of iron therefrom. The valve 5 may be adjusted to provide a suitable rate of feed of the material 4 to the container 1. Due to the vibration of the container 1 caused by the hammers 8, the material 4 in the container 1 is agitated and caused to rebound periodically from the bottom of the container 1. When the apparatus is first started, the combustible constituents of the material 4 may be ignited as by flaming material disposed in the container for this purpose. When combustion of the material 4 is once started said combustion is self-maintaining, the fuel being the oily or other combustible material in the material 4. The flames from the burning oil travel upwardly through the container 1 and outwardly through the stack 6. It will be noted that the flames and gaseous products of combustion traveling upwardly through the container 1 serve to heat the material 4 entering the container 1 and to ignite the combustible constituents thereof. The air entering through the lower aperture 10 assists in making this combustion substantially complete.

The length of the container 1, the rate of feed of material 4 thereto, and the rate of movement of said material therethrough are such that the combustible constituents of said material 4 are substantially completely burned out when the material 4 has completed its passage through the container. When the material 4, free from oily and other combustible material, reaches the lower end of the container 1, the particles of said material, for example, iron and aluminum, are immediately acted upon by the magnetic drum 10, whereby the iron and other magnetic content 14 of the material 4 pass into the container 16, whereas the aluminum and non-magnetic content of the material 4 pass into the container 15.

The aluminum 13, substantially free from iron, may be smelted to form a product substantially free from iron and substantially purer in this respect than has heretofore been obtainable.

It will be understood, of course, that the process contemplated by my invention may be carried out with various forms of apparatus.

It will thus be seen that I have provided a method whereby substantially iron-free aluminum may be recovered from mixtures containing iron and aluminum in small particles together with oily or other viscous material.

It will further be noted that I have provided a simple, economical and efficient apparatus for recovering aluminum from oily borings, tailings and the like containing iron in finely divided state.

Furthermore, it is to be understood that the particular forms of apparatus shown and described, and the particular procedure set forth, are presented for purposes of explanation and illustration and that various modifications of said apparatus and procedure can be made without departing from my invention, as defined in the appended claims.

What I claim is:

1. The method of recovering aluminum from a mixture of finely divided aluminum and iron containing viscous combustible material which has already been subjected to the action of a magnetic separator, which comprises exposing said mixture to a flame in an oxidizing atmosphere to consume the viscous material, and delivering the free metallic particles to a magnetic separator.

2. The method of separating an oily mixture of finely divided metallic particles containing non-magnetic and magnetic material, which comprises disposing said oily mixture in a container, igniting the oily material, agitating the particles to cause complete combustion of the combustible material, and magnetically separating the non-magnetic from the magnetic material in said oil-free mixture.

3. The method of separating an oily mixture of finely divided metallic particles containing aluminum and iron, which comprises moving said mixture progressively through a container, causing the oil in said mixture to be substantially completely burned therefrom during said passage, and magnetically separating the aluminum from the iron in said oil-free mixture.

4. The method of continuously separating an oily mixture of small metallic particles containing aluminum and iron, which comprises moving said mixture progressively through a container, simultaneously agitating said mixture to expose said particles more completely to combustion, and delivering the oil-free particles directly to a magnetic separator and thereby separating the aluminum from the iron.

5. The method of continuously separating a mixture of small metallic particles containing aluminum and iron and combustible material including oil, which comprises moving said mixture progressively through a container, simultaneously agitating said mixture to expose said particles more completely to combustion, causing the flame and heated gases from said combustion to travel through the container toward the incoming cold particles, and delivering the oil-free particles directly to a magnetic separator and thereby separating the aluminum from the iron.

6. The method of continuously separating an oily mixture of finely divided metallic particles containing aluminum and iron, which comprises moving said mixture progressively through a container, igniting the oil in said mixture and removing oil and any combustible material substantially completely by combustion, and delivering the oil-free particles directly to a magnetic separator and separating the aluminum from the iron.

7. The method of continuously separating an oily mixture of finely divided particles containing aluminum and iron, which comprises causing said oily mixture to move in a downwardly inclined path, agitating said mixture to continuously expose new surfaces, igniting the inflammable material in said oily mixture, causing the flame from said combustion to travel upwardly in an inclined manner toward downcoming mixture to contact with, heat and ignite said downcoming mixture, and subjecting the downwardly moving substantially oil-free mixture to magnetic action whereby to separate the aluminum from the iron in said mixture.

In testimony whereof I affix my signature.

JOHN G. G. FROST.